(12) United States Patent
Chen et al.

(10) Patent No.: US 11,043,808 B2
(45) Date of Patent: Jun. 22, 2021

(54) METHOD FOR IDENTIFYING PATTERN OF LOAD CYCLE (71) Applicants: CHINA ELECTRIC POWER RESEARCH INSTITUTE COMPANY LIMITED, Beijing (CN); STATE GRID CORPORATION OF CHINA, Beijing (CN); STATE GRID FUJIAN ELECTRIC POWER RESEARCH INSTITUTE, Fuzhou (CN); GLOBAL ENERGY INTERCONNECTION RESEARCH INSTITUTE CO., LTD., Beijing (CN)

(72) Inventors: Zhenyu Chen, Beijing (CN); Dapeng Li, Beijing (CN); Yunhao Huang, Beijing (CN); Fangchun Di, Beijing (CN); Lixin Li, Beijing (CN); Guangyi Liu, Beijing (CN); Wendong Zhu, Beijing (CN); Yangchun Hao, Beijing (CN); Yi Zhang, Beijing (CN); Jinxiang Chen, Beijing (CN)

(73) Assignees: CHINA ELECTRIC POWER RESEARCH INSTITUTE CO. LTD., Beijing (CN); STATE GRID CORPORATION OF CHINA, Beijing (CN); STATE GRID FUJIAN ELECTRIC POWER RESEARCH INST., Fuzhou (CN); GLOBAL ENERGY INTERCONNECTION RES. INST. CO. LTD., Beijing (CN)

( * ) Notice: Subject to any disclaimer, the term of this patent is extended or adjusted under 35 U.S.C. 154(b) by 397 days.

(21) Appl. No.: 15/778,312

(22) PCT Filed: Oct. 30, 2017

(86) PCT No.: PCT/CN2017/108377
§ 371 (c)(1),
(2) Date: May 23, 2018

(87) PCT Pub. No.: WO2018/082523
PCT Pub. Date: May 11, 2018

(65) Prior Publication Data
US 2018/0351355 A1 Dec. 6, 2018

(30) Foreign Application Priority Data

Nov. 2, 2016 (CN) .......................... 201610943890.9

(51) Int. Cl.
*H02J 3/00* (2006.01)
*G05B 13/04* (2006.01)
(Continued)

(52) U.S. Cl.
CPC .............. *H02J 3/00* (2013.01); *G05B 13/048* (2013.01); *G06Q 10/04* (2013.01); *G06Q 10/06* (2013.01);
(Continued)

(58) Field of Classification Search
CPC .... G06Q 10/04; G05B 13/026; G05B 13/048; G06F 16/285
See application file for complete search history.

(56) References Cited

U.S. PATENT DOCUMENTS

| | | | |
|---|---|---|---|
| 9,753,477 B2 | 9/2017 | Berka et al. | |
| 2011/0251807 A1* | 10/2011 | Rada | G01D 4/00 702/61 |

(Continued)

FOREIGN PATENT DOCUMENTS

| | | |
|---|---|---|
| CN | 103268524 A | 8/2013 |
| CN | 103325071 A | 9/2013 |

(Continued)

OTHER PUBLICATIONS

Paparrizos, k-Shape: Efficient and Accurate Clustering of Time Series, SIGMOD '15, May 31-Jun. 4, 2015, Melbourne, Victoria, Australia. (Year: 2015).*

(Continued)

Primary Examiner — Michael J Dalbo
(74) Attorney, Agent, or Firm — Syncoda LLC; Feng Ma (57) ABSTRACT

A method for identifying a pattern of a load cycle includes: performing statistics on a daily load of a system based on smart meter data; generating a curve of the daily load of the system according to the statistics on the daily load of the system; acquiring a result of clustering curves of loads of typical days by applying shape-based time sequence clustering analysis using the curve of the daily load of the system; and identifying a pattern of a load cycle according to the result of clustering the curves of the loads of the typical days.

9 Claims, 4 Drawing Sheets

(51) Int. Cl.
  *H02J 13/00*   (2006.01)
  *G06Q 10/04*   (2012.01)
  *G06Q 50/06*   (2012.01)
  *G06Q 30/02*   (2012.01)
  *G06Q 10/06*   (2012.01)

(52) U.S. Cl.
  CPC ........ *G06Q 30/0202* (2013.01); *G06Q 50/06* (2013.01); *H02J 13/0013* (2013.01); *H02J 3/003* (2020.01)

(56) References Cited

U.S. PATENT DOCUMENTS

| | | | | |
|---|---|---|---|---|
| 2013/0080210 A1* | 3/2013 | Vogel | ............ | G06Q 10/06 705/7.33 |
| 2014/0324532 A1* | 10/2014 | Ghosh | ............ | G06Q 30/0202 705/7.31 |
| 2015/0161233 A1* | 6/2015 | Flora | ............ | G06Q 10/06315 707/737 |
| 2015/0316907 A1* | 11/2015 | Elbsat | ............ | G06N 20/00 700/275 |
| 2016/0042049 A1* | 2/2016 | Shilts | ............ | G06Q 10/04 707/603 |
| 2016/0077538 A1 | 3/2016 | Berka et al. | | |
| 2017/0262945 A1* | 9/2017 | Niikura | ............ | G06Q 50/06 |
| 2018/0013289 A1* | 1/2018 | Uenishi | ............ | H02J 3/14 |

FOREIGN PATENT DOCUMENTS

| | | | | |
|---|---|---|---|---|
| CN | 103577883 A | 2/2014 | | |
| CN | 104318322 A | 1/2015 | | |
| CN | 104680261 A | 6/2015 | | |
| CN | 105528660 A | 4/2016 | | |
| CN | 105608512 A | 5/2016 | | |
| WO | WO-2015062277 A1 * | 5/2015 | ............ | G06Q 10/04 |

OTHER PUBLICATIONS

Flath, C., Nicolay, D., Conte, T. et al. Cluster Analysis of Smart Metering Data. Bus Inf Syst Eng 4, 31-39 (2012). https://doi.org/10.1007/s12599-011-0201-5 (Year: 2012).*
International Search Report in the international application No. PCT/CN2017/108377, dated Feb. 8, 2018.
English translation of the Written Opinion of the International Search Authority in the international application No. PCT/CN2017/108377, dated Feb. 8, 2018.
Duan, Qing et al. "Application and Electrical Load Data Clustering Algorithm Using Multi Hierarchy Analysis Based on Time Series Curve Contour Similarity", Electrotechnical Application, vol. 27, No. 20; pp. 53-56, Oct. 20, 2008 (Oct. 20, 2008), ISSN: 1672-9560.
First Office Action of the Chinese application No. 201610943890.9, dated Mar. 16, 2021.
Tian, Hailong "Research on Power Short-term Load Forecasting Based on Cluster Analysis and SVM" Apr. 30, 2014.
Song Ci, Pei Tao "Research Progress in Time Series Clustering Methods Based on Characteristics" Institute of Geographic Sciences and Natural Resources Research, CAS, Bejjing 100101, China.

* cited by examiner

METHOD FOR IDENTIFYING PATTERN OF LOAD CYCLE

CROSS-REFERENCE TO RELATED APPLICATIONS

The present application is based on, and claims priority to, Chinese Patent Application No. 201610943890.9, filed on Nov. 2, 2016, the contents of which are hereby incorporated by reference in its entirety.

TECHNICAL FIELD

The present disclosure relates to automation of power dispatching, and in particular to a method for identifying a pattern of a load cycle.

BACKGROUND

A system may be planned, load prediction may be performed, a behavior of power consumption of a user may be analyzed, a response may be made to a demand, etc., by categorizing a pattern of the load of the system. Load prediction may be vital for planning a power system, and provide also a basis for economic operation of the power system. Clustering analysis is commonly used to categorize the pattern of the load.

With clustering analysis, a multidimensional dataset may be divided into groups, with points in each group being similar to one another, and points from different groups differ from one another as much as possible. A curve of a daily load of a power system is of data of a time sequence (or time-series). In clustering analysis of the curve, a similarity may be determined basically by clustering according but to a geometric average distance (such as an Euclidean distance). For a curve of a load characterized by a time sequence, a measure of a similarity using a geometric average distance is of limited use, in that an inter-sequence distance is to be computed for each pair of points. In addition, data of a time sequence may be impacted by a factor such as a noise, a scale, a translation, a magnitude, etc., of a time sequence, making the clustering process difficult.

K-Means clustering is used most widely at present. A method such as Self-Organizing Map (SOM), time sequence analysis, etc., may apply as well. None of the methods is ideal for capturing an accurate feature of a shape of a pattern of a load. The SOM has a strict requirement on data, as it requires a value for each dimension of a sample member. A mean function of Dynamic Time Warping (DTW) in the time sequence analysis fails to reserve an average result having a trait of a raw shape.

With conventional cross-correlation measurement, only clustering between one point and another point is compared. Many advanced applications of a smart grid may have to be based on a cyclic variation of a load of a system, such as over seasons, holidays, workdays, weekends, etc. A time range of such a cyclic variation may be set manually, without being verified by data.

SUMMARY

Embodiments herein provide a method for identifying a pattern of a load cycle.

A technical solution according to an embodiment herein may be implemented as follows.

According to an embodiment herein, a method for identifying a pattern of a load cycle includes:

a step (1) of performing statistics on a daily load of a system based on smart meter data;

a step (2) of generating a curve of the daily load of the system according to the statistics on the daily load of the system;

a step (3) of acquiring a result of clustering curves of loads of typical days by applying shape-based time sequence clustering analysis using the curve of the daily load of the system; and a step (4) of identifying a pattern of a load cycle according to the result of clustering the curves of the loads of the typical days.

The method may further include:

a step (5) of simultaneously performing load prediction according to the result of clustering the curves of the loads of the typical days.

In steps (1) and (2), a curve of a load for 24 hours of the system, i.e., the curve of the daily load of the system, may be acquired by accumulating a curve of a load for 24 hours consumed by each smart meter user in an area or the system.

The smart meter data may include active power, reactive power, a voltage, a current, a power factor, etc. The load may be an active power reading.

In step (2), the curve of the daily load of the system may describe variation of the load over time within a day. The curve of the daily load may vary depending on a workday, a weekend, a holiday, etc., of a season in a region. A curve of a load of a typical day in a typical season, including a curve of a load of a typical day and a typical curve of a continued daily load, may be used.

Analysis of an impact factor and a trait of regional power consumption, estimation of a trend of variation of characteristics of the load, a structure of a power supply of the system, a peak regulating capacity, staggering of peaks of interconnected systems, etc., may be based on the curve of the load of the typical day.

In step (3), time sequence clustering analysis may depend on distance measurement. Curves of similar shapes may be clustered together by shape-based clustering, to reduce impact of a difference in an amplitude and a difference in a phase on time sequence clustering.

A similarity between shapes of two time sequences may be measured via shape-based time sequence clustering analysis by computing cross-correlation of the two time sequences, by comparing the similarity between a time sequence $\vec{x}=(x_1, \ldots, x_m)$ and a time sequence $\vec{y}=(y_1, \ldots, y_m)$, by first keeping the time sequence $\vec{y}$ invariant and computing a distance by which the time sequence $\vec{x}$ is to be translated, as:

$$\vec{x} = \begin{cases} (\underbrace{0, \ldots, 0}_{|s|}, x_1, x_2, \ldots, x_{m-s}), & s \geq 0 \\ (x_{1-s}, \ldots, x_{m-1}, x_m, \underbrace{0, \ldots, 0}_{|s|}), & s < 0 \end{cases}.$$

$s \in [-m, m]$, $CC_\omega(\vec{x}, \vec{y}) = (c_1, \ldots, c_\omega)$. The m may be a number of time sequences. The $\omega$ may represent $\omega$th time sequence. $\omega \in \{1, 2, \ldots, 2m-1\}$. The $CC_\omega$ may be a cross-correlation sequence. The $x_1, \ldots, x_m$ may be elements of the time sequence $\vec{x}$. The $y_1, \ldots, y_m$ may be elements of the time sequence $\vec{y}$. The $\epsilon$ may be an offset of the $\vec{x}$.

A cross-correlation sequence of a length of 2m−1 may be defined as:

$$CC_\omega(\vec{x}, \vec{y}) = R_k(\vec{x}, \vec{y}), \omega \in \{1, 2, \ldots 2m-1\}.$$

$$R_k(\vec{x}, \vec{y}) = \begin{cases} \sum_{l=1}^{m-k} x_{l+k} y_l, & k \geq 0 \\ R_{-k}(\vec{y}, \vec{x}), & k < 0 \end{cases}.$$

A value $\omega$ that maximizes the $CC_\omega(\vec{x}, \vec{y})$ is to be computed. An optimal value $\vec{x}_s$ by which the $\vec{x}$ is to be translated based on the $\vec{y}$ is to be computed based on the value $\omega$. s=k ∘$R_k$($\vec{x}$, $\vec{y}$). The l may be an integer starting at 1. The K may be any integer, zero or a negative integer, with an absolute value less than the m. The $R_k$ may represent a cross-correlation sequence. The $x_{l+k}$ may be an element of the time sequence $\vec{x}$. The $R_{-k}$ may represent a cross-correlation sequence. The $y_l$ may be an element of the time sequence $\vec{y}$.

In step (4), each cluster in the result of clustering the curves of the loads of the typical days acquired by the shape-based time sequence clustering analysis may correspond to a typical type of the daily load in actual data. The typical type of the daily load may include a workday in winter, a holiday in spring, a weekend in summer, etc. The pattern of the load cycle may be identified by data-driven clustering of the curve of the daily load of the system acquired according to the smart meter data of all users in a region. A result of the data-driven clustering may describe and identify the pattern of the load cycle of the system.

In step (5), shape-based time sequence clustering analysis may be applied to curves of loads of typical days, and the load of the system may be predicted as follows. Shape-based time sequence clustering analysis may be applied to curves of loads of typical days, and the load of the system may be predicted as follows. A similar day in history may be searched for according to a factor such as a type of a date, a period of time for central heating, a temperature, a rainfall, etc., accurate grouping or clustering by the shape-based time sequence clustering analysis according to an embodiment herein, and a curve of the daily load in a historical year. A curve of a load of the system for a day to be predicted may be estimated accurately according to a curve of the load for the similar day in history, a curve of the load for recent days, weather forecast data, etc. The type of the date may include spring, summer, fall, winter, workdays, holidays, etc.

A simple summarization is given below to allow a basic understanding of aspects disclosed herein. The summarization is not a general comment, and is not intended to determine a key/vital component or describe a scope of embodiments herein, but to show some concepts in simple forms as a preamble to subsequent elaborations.

A technical solution according to embodiments herein has beneficial effects as follows.

With the method for data-driven shape-based system load clustering according to embodiments herein, the pattern of the load cycle of the system may be identified using the data-driven shape-based system load clustering, such that characteristics such as a season, a type of a workday, a holiday, etc., of the load of the system may be acquired accurately, and a conclusion is made driven by data, avoiding determining a cycle of the load of the system merely from experience, thus increasing an accuracy in load prediction, lowering energy consumption, reducing a cost of power generation, improving economic and social benefits of a power system, etc.

With a system for identifying a pattern of a load cycle and shape-based system load clustering, a law of the daily load of the system in the area may be explored using massive smart meter data, facilitating finding a pattern of a global distribution, avoiding computation of a single index or averaging, lowering impact of a random factor or a subjective factor, which is suitable for finding a law hidden in large-scale data, and is better for representing an overall law.

DETAILED DESCRIPTION

Implementation of the present disclosure is further elaborated below with reference to the drawings.

A solution for implementing the present disclosure is fully displayed by description and the drawings below to allow those skilled in the art to implement the solution. Another solution for implementing the present disclosure may include a structural change, a logical change, an electric change, a change in a process, etc. An embodiment may represent but a possible variation. Unless explicitly required, an individual component and function may be optional. In addition, an order of operations may vary. A part and a feature of a solution may be included in, or may replace, a part and a feature of another solution. A scope of a solution for implementing the present disclosure may cover an entire scope of the claims and any available equivalent of the claims. Here, such a solution for implementing the present disclosure is not intended to automatically limit the scope of the application to any individual disclosure or inventive concept.

When comparing data of different time sequences, shape-based clustering may keep a trait of a shape of a time sequence, by measuring a similarity between shapes of two standardized time sequences by computing cross-correlation of the time sequences. With conventional cross-correlation measurement, only clustering between one point and another point is compared. With the shape-based clustering, characteristics of a sequence of successive points of a time sequence may be taken into consideration.

Many advanced applications of a smart grid may have to be based on a cyclic variation of a load of a system. With embodiments herein, a daily load of the system may be categorized by using shape-based clustering analysis. A result of the clustering may accurately describe the cyclic variation of the load of the system, such as over seasons, holidays, workdays, weekends, etc., providing basis for short-term, medium-term, long-term load prediction, etc.

Terms and Definitions

1) By clustering analysis, information may be gathered according to similarity of the information with no knowledge of a category where the information is to be put. The clustering aims at minimizing a difference between individuals of one category, and maximizing a difference between individuals of different categories. Therefore, by clustering, observed contents may be organized into a hierarchical structure by organizing similar objects together.

2) A K-Means algorithm may be hard clustering, and may represent typical prototype-based objective function clustering. A distance between a data point and a prototype may serve as an optimized objective function. A rule for adjusting iteration may be acquired by finding an extremum of the function. With the K-Means algorithm, a Euclidean distance may serve as a measure of a similarity. An optimal category of a center vector V corresponding to an initial clustering that minimizes an assessment index J may be acquired. With the algorithm, a squared error and a clustering function may serve as a clustering criterion function.

3) A time sequence may be a particular form of data. A prediction application with one or more time attributes may be referred to as a time sequence problem. A historical value of the sequence may impact a future value. A magnitude and mode of such an impact may be portrayed by a behavior such as instability, a trend cycle in the time sequence, etc.

4) A curve of a load may describe variation of the load over a period of time, and reflect characteristics, as well as a law, of power consumption by a user.

5) A load cycle may refer to a regular variation of a magnitude of the load over time, such as a regular variation over a type such as a season, a workday, etc.

6) With load prediction, load data at a future time point may be determined according to factors such as a social impact, a natural condition, a capacity expansion decision, characteristics of operation of the system, etc., while meeting a required accuracy.

According to an embodiment herein, a method for identifying a pattern of a load cycle, which may be understood as a method for identifying a pattern of a load cycle and shape-based system load clustering, includes steps as follows.

In step (1), statistics on a daily load of a system may be made based on smart meter data.

In step (2), a curve of the daily load of the system may be generated according to the statistics on the daily load of the system.

In step (3), a result of clustering curves of the loads of the typical days may be acquired by applying shape-based time sequence clustering analysis.

In step (4), a pattern of a load cycle may be identified according to the result of the clustering.

In step (5), load prediction may be performed at the same time.

A system for identifying a pattern of a load cycle and shape-based system load clustering may include an algorithm for shape-based time sequence clustering analysis, identification of a pattern of a load cycle of the system, division of the load of the system according to a season, a workday, a holiday, etc. The system may cluster the curve of the daily load, identify a cycle of the load of the system, divide the load of the system according to a season, a workday, a weekend, a holiday, etc. A load prediction may be made on such a basis.

A system for identifying a pattern of a load cycle and shape-based system load clustering may include functions of: performing statistics on a daily load of a system based on smart meter data; generating a curve of the daily load of the system according to the statistics on the daily load of the system; clustering curves of the loads of the typical days according to shape-based clustering analysis; identifying a pattern of a load cycle; performing load prediction, etc. The statistics on the daily load of the system may be performed based on the smart meter data by counting the daily load of the system according to power consumption by all users, i.e., the smart meter data. The curve of the daily load of the system may then be generated. The result of clustering the curves of the loads of the typical days may be acquired by applying the shape-based clustering analysis. The pattern of the load cycle may be identified according to the result of the clustering. The load may then be predicted.

Figure 1:
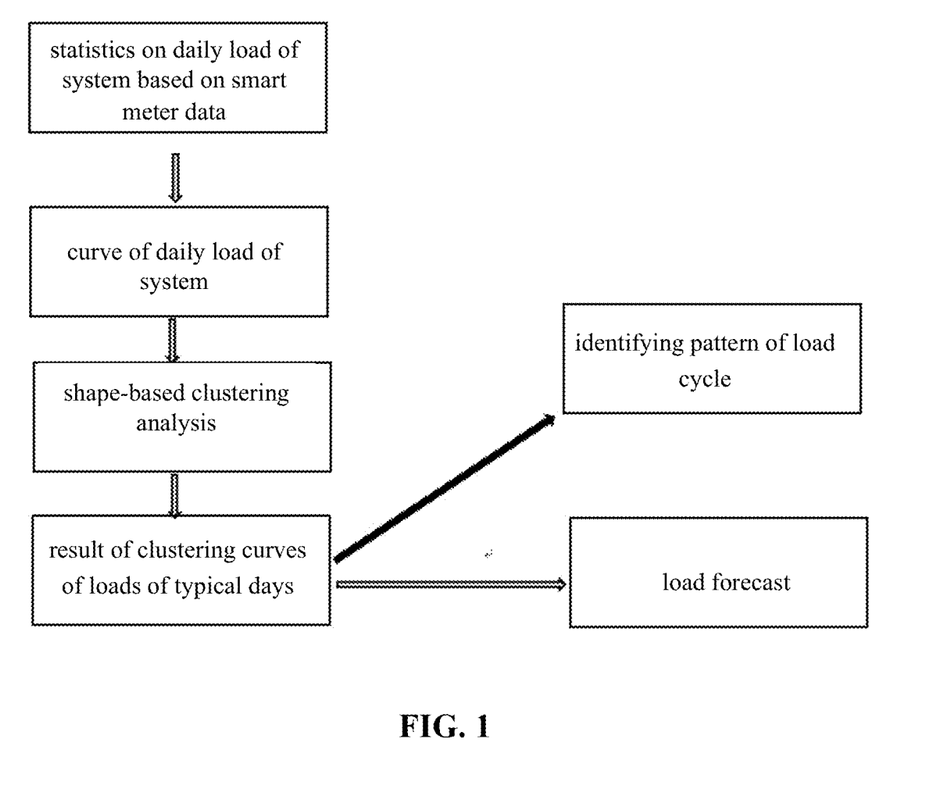
FIG. 1 is a diagram of a structure of a system for identifying a pattern of a load cycle and shape-based system load clustering according to an embodiment herein.

FIG. 1 shows a structure of a system for identifying a pattern of a load cycle and shape-based system load clustering. Data of time sequences with a significant feature of the shape may be clustered or grouped effectively via the shape-based system load clustering, which is characterized by emphasizing a similarity between shapes, tolerating a difference in an amplitude and a phase within a given accuracy, thereby clustering data of time sequences with similar shapes into a group.

In step (2), the curve of the daily load of the system may describe the variation of the load over hours of the day. A curve of a load for 24 hours of the system, i.e., the curve of the daily load of the system, may be acquired by accumulating a curve of a load for 24 hours consumed by each smart meter user in an area or the system.

The smart meter data may include active power, reactive power, a voltage, a current, a power factor, etc. The load may be an active power reading.

The curve of the daily load of power consumption may be considered.

The curve of the daily load may vary depending on a workday, a weekend, or a holiday of a season in a region. A representative curve of the load of the typical day in a typical season, including a curve of a load of a typical day, a typical curve of a continued daily load (representing continued approximation of the daily load within a period of time), etc., may be used.

The curve of the load of the typical day may be the most representative curve in curves of the daily load within a period of time. Analysis of an impact factor and a trait of regional power consumption, estimation of a trend of variation of characteristics of the load, a structure of a power supply of the system, a peak regulating capacity, staggering of peaks of interconnected systems, etc., may be based on the curve of the load of the typical day, which has long been a foundation work of a power system. A typical day may be selected based on simplicity as well as actuality. For example, a curve of the daily load on a workday in summer may be selected as a curve of a load of a typical day. Such a processing mode has no basis, and may be impacted seriously by a random factor.

With the shape-based system load clustering according to an embodiment herein, a law hidden in a massive amount of data may be acquired, reducing impact of a random factor or a subjective factor.

A curve of the load may actually be data of a time sequence. For data of a time sequence, the shape-based clustering may be more accurate than conventional Euclidean-distance-based clustering. The method according to an embodiment herein may apply to the smart meter data. Curves of daily loads of the system of a year in a region may be acquired via daily statistics on collected annual data of all users in the region. Clustering analysis may be performed on the curves of the daily loads using the shape-based clustering.

A number may be selected as an optimal number of clusters, if increasing of the number brings no significant improvement to the result of the clustering. The result of the clustering may be assessed by a sum of distances of time sequences to a center thereof. The less the sum is, the better.

In step (3), the time sequence clustering may depend on distance measurement. For analysis of data of time sequences (namely, time series), the shape-based clustering may be better than the conventional K-Means algorithm. K-Means clustering mainly may depend on distance measurement. Variation of a curve of a time sequence may make the clustering difficult. With the shape-based clustering, curves with similar shapes may be put into one cluster, reducing impact of a difference in an amplitude and a difference in a phase on time sequence clustering.

Different time sequences may be computed in one data framework. A result of clustering may be impacted by a difference in an amplitude and a difference in a phase of a time sequence. Conventional clustering, such as the K-Means algorithm, is based on a Euclidean distance. The Euclidean distance may not apply to a sequence of major variation, such as a time sequence. It may be better to measure distances between time sequences of different curves with similar shapes by Dynamic Time Warping (DTW).

A Euclidean distance may be sensitive to slight variation of a sequence on a time axis. Slight variation may lead to major variation in a Euclidean distance between two sequences. This is because computation of a Euclidean distance requires point-to-point correspondence of two sequences. With a slight offset of a sequence on the time axis, there may be a major change in a Euclidean distance, preventing similar sequences from being clustered together.

Figure 2:
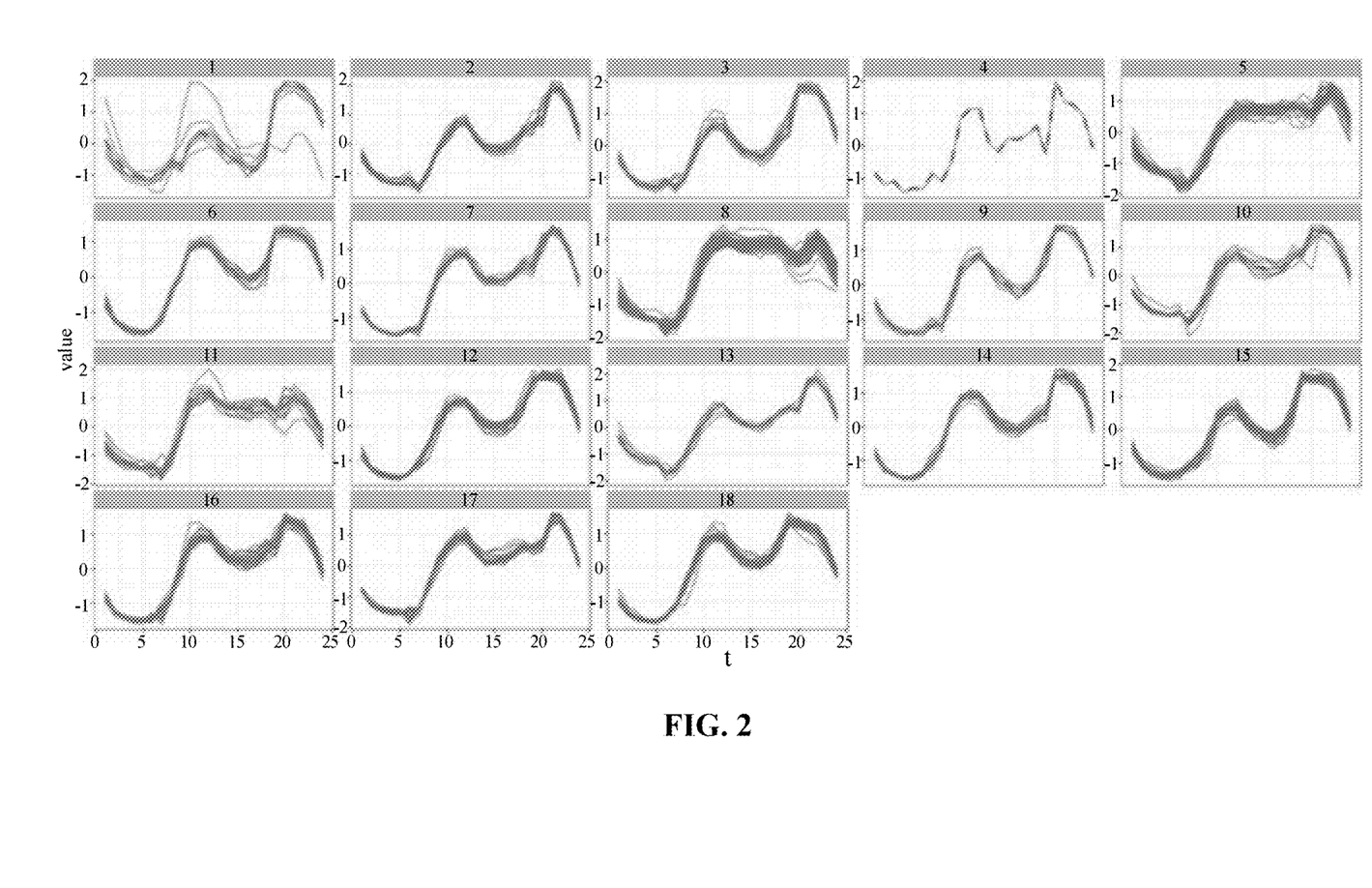
FIG. 2 is a diagram of measuring a similarity between shapes of two time sequences using cross-correlation of the time sequences according to an embodiment herein.

A similarity between shapes of two time sequences may be measured via shape-based time sequence clustering analysis by computing cross-correlation of the two time sequences. Comparison of one versus multiple as well as comparison of one versus none may be added.

The similarity between a time sequence $\vec{x}=(x_1, \ldots, x_m)$ and a time sequence $\vec{y}=(y_1, \ldots, y_m)$ may be compared, by first keeping the time sequence $\vec{y}$ invariant and computing a distance by which the time sequence $\vec{x}$ is to be translated, as:

$$\vec{x} = \begin{cases} (\overbrace{0, \ldots, 0}^{|s|}, x_1, x_2, \ldots, x_{m-s}), & s \geq 0 \\ (x_{1-s}, \ldots, x_{m-1}, x_m, \underbrace{0, \ldots, 0}_{|s|}), & s < 0 \end{cases},$$

$s \in [-m, m]$, $CC_\omega(\vec{x}, \vec{y})=(c_1, \ldots, c_\omega)$. The m may be a number of time sequences. The $\omega$ may represent a $\omega$th time sequence. $\omega \in (1, 2, \ldots, 2m-1)$. The may be a cross-correlation sequence. The $x_1, \ldots, x_m$ may be elements of the time sequence $\vec{x}$. The $y_1, \ldots, y_m$ may be elements of the time sequence $\vec{y}$. The s may be an offset of the $\vec{x}$. The $\epsilon$ may represent belonging to a set.

A cross-correlation sequence of a length of 2m−1 may be defined as:

$$CC_\omega(\vec{x}, \vec{y}) = R_k(\vec{x}, \vec{y}), \omega \in \{1, 2, \ldots 2m-1\}.$$

$$R_k(\vec{x}, \vec{y}) = \begin{cases} \sum_{l=1}^{m-k} x_{l+k} y_l, & k \geq 0 \\ R_{-k}(\vec{y}, \vec{x}), & k < 0 \end{cases}.$$

A value $\omega$ that maximizes the $CC_\omega(\vec{x}, \vec{y})$ is to be computed. An optimal value $\vec{x_s}$ by which the $\vec{x}$ is to be translated based on the $\vec{y}$ is to be computed based on the value $\omega$. s=k ∘$R_k(\vec{x}, \vec{y})$. The l may be an integer starting at 1. The K may be any integer, zero or a negative integer, with an absolute value less than the m. The $R_k$ may represent a cross-correlation sequence. The $y_l$ may be an element of the time sequence $\vec{y}$. The $R_{-k}$ may represent a cross-correlation sequence. The $y_l$ may be an element of the time sequence $\vec{y}$.

In step (4), the magnitude of the load may vary regularly over time. For example, it may vary regularly over a type such as a season, a workday, a holiday, etc. A law of load variation may be a continuation of a historical law of load variation. Mastering the law of load variation is vital for improving accuracy in load prediction, lowering energy consumption, reducing a cost of power generation, improving economic and social benefits of a power system, etc.

At present, a power company and a software provider of a power system may divide a load cycle of the system based mostly on experience. For example, summer may start from June $1^{st}$ and end at August 31st. A method herein I data driven in that identification pf a load cycle is based completely on data. The curve of the daily load of the system acquired according to the smart meter data of all users in a local region may be clustered. A result of the clustering may describe and identify the pattern of the load cycle of the system. For example, a load in summer in the region may start, not from June 1st, but from late May, and end, not by August 31th, but by the middle of September.

Each cluster in a typical result of clustering the curves of the loads of the system acquired by the shape-based time sequence clustering analysis may correspond to a typical type of the daily load in actual data. The typical type of the daily load may include a workday in winter, a holiday in spring, a weekend in summer, etc.

Figure 3:
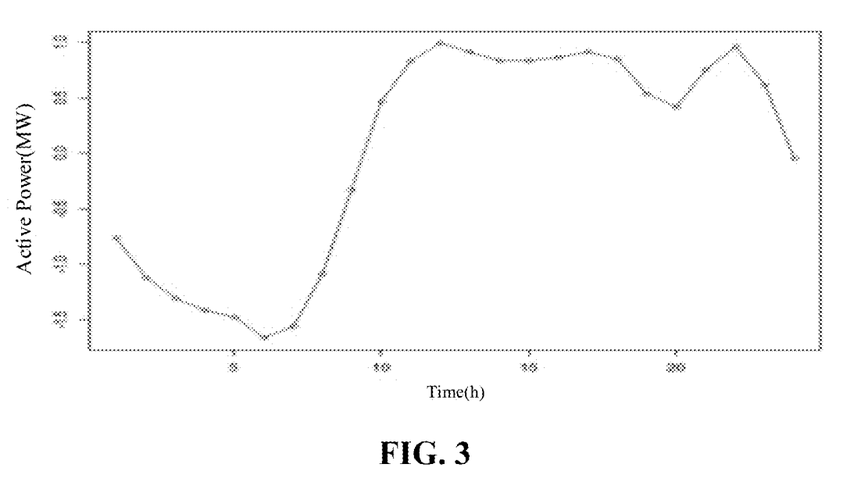
FIG. 3 is a curve of a load on a workday in summer according to an embodiment herein.
Figure 4:
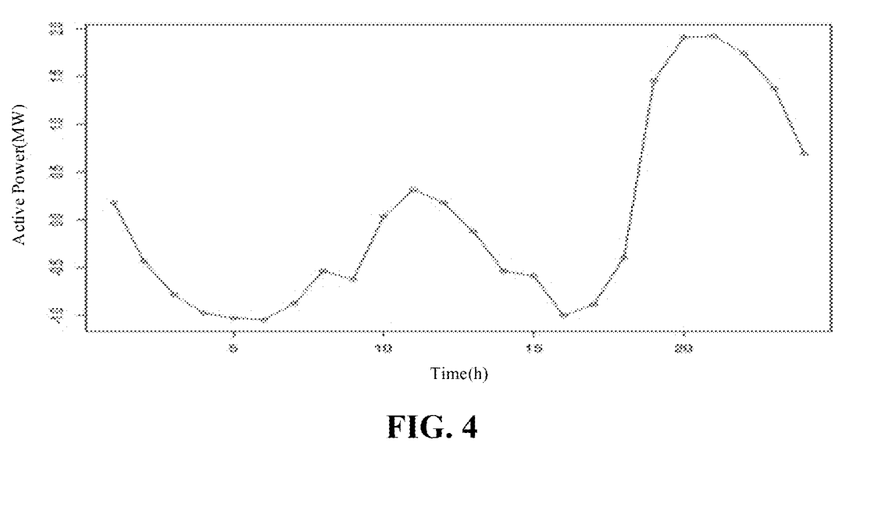
FIG. 4 is a curve of a load on a particular holiday, such as the Chinese New Year, according to an embodiment herein.

FIG. 3 shows a curve of a load on a workday in summer. Peaks of power consumption may appear at about 10 A.M. and 3 P.M. FIG. 4 shows a curve of a load on a particular holiday, such as the Chinese New Year. Power consumption may peak at about 7 P.M. By performing clustering analysis on actual smart meter data of power consumption in 2014 in an area of Beijing using the method according to an embodiment herein, 18 clusters may be acquired, including: (1) the Chinese New Year, (2) the Tomb-Sweeping Day and the May Day, (3) the National Day, (4) a particular day (for the National People's Congress), (5) holidays in summer, (6) workdays in winter (central heating+getting warm), (7) workdays in spring (lower temperature), (8) workdays in summer, (9) holidays in winter (low temperature, central heating), (10) holidays in fall, (11) workdays in fall (high temperature), (12) workdays in winter, (13) holidays in spring, (14) workdays in spring (central heating), (15) holidays in winter (getting warm), (16) workdays in spring and fall, (17) workdays in spring (getting warm), and (18) workdays in winter (central heating).

Identification of the pattern of the load cycle may be data driven. The pattern of the load cycle of the system may be described and identified by the result of shape-based clustering of the curve of the daily load of the system acquired according to the smart meter data of all users in the local region. The result of the clustering may be distributed to the whole year, as shown in FIG. 4, so as to acquire a cycle of variation of the daily load of the system over seasons, workdays, holidays, etc. For example, a load in summer in a certain area of Beijing may start from May $20^{th}$, and end by September 10th.

In step (5), with a trend of variation of the load, a power company may arrange a mode of operation of a power system, a plan of power supply equipment, a plan of equipment overhaul, etc. Load prediction may be vital for both planning and operation of the power system. An accurate result of load prediction may facilitate improving security and stability of the system, reducing a cost of power generation.

As the trend of the curve of the load is closely related to factors such as a type of days, weather, etc., clustering analysis on historical curves of the load may provide a basis for load prediction. For massive loads of users, tremendous waste of resources may result if there is no targeted research on a law of power consumption by each user. Therefore, dates of loads with similar laws of power consumption may be clustered into one category via proper data mining plus clustering analysis.

With popularization of smart meters, collecting of complete information on power consumption by a user of a grid may provide a data basis for mastering accurately a law of variation of the load at a user-level. At present, a dispatching department mainly aims at short-term prediction of a total load, or a load of a bus of a transformer substation. The total load may be acquired by accumulating the loads of the buses. A load of a grid may consist of loads of many users. Loads of different users may obey various laws due to attributes of industries thereof and characteristics of productions. Massive amount of information on user-level loads collected by a system for collecting information on power consumption may allow load prediction starting from the user-level loads.

Shape-based time sequence clustering analysis may be applied to curves of loads of typical days, and the load of the system may be predicted as follows. Shape-based time sequence clustering analysis may be applied to curves of loads of typical days, and the load of the system may be predicted as follows. A similar day in history may be searched for according to a factor such as a type of a date, a period of time for central heating, a temperature, a rainfall, etc., accurate grouping or clustering by the shape-based time sequence clustering analysis according to an embodiment herein, and a curve of the daily load in a historical year. A curve of a load of the system for a day to be predicted may be estimated accurately according to a curve of the load for the similar day in history, a curve of the load for recent days, weather forecast data, etc. The type of the date may include spring, summer, fall, winter, workdays, holidays, etc.

Characteristics of a sequence of successive points of a time sequence may be taken into consideration according to an embodiment herein.

Many advanced applications of a smart grid may have to be based on a cyclic variation of a load of a system, such as over seasons, holidays, workdays, weekends, etc. A time range of such a cyclic variation may be set manually, without being verified by data. To this end, with embodiments herein, a daily load of the system may be categorized by using shape-based clustering analysis for the first time. A result of the clustering may accurately describe the cyclic variation of the load of the system, such as over seasons, holidays, workdays, weekends, etc., providing basis for short-term, medium-term, long-term load prediction, etc.

The embodiments are merely for explaining a technical solution herein, and are not intended to limit the present disclosure. The present disclosure is elaborated with the embodiments. Those skilled in the art may make a modification and/or equivalent replacement to implementation herein without departing form the spirit and scope of the present disclosure. Any such modification and/or equivalent replacement should be covered by the claims herein.

INDUSTRIAL APPLICABILITY

With a solution according to embodiments herein, a curve of a daily load of a system may be generated according to statistics on the daily load of the system based on smart meter data. A result of clustering curves of loads of typical days may be acquired by applying shape-based time sequence clustering analysis. A pattern of a load cycle may be identified according to the result of clustering the curves of the loads of the typical days. The pattern of the load cycle of the system may be identified using data-driven shape-based time sequence clustering analysis, such that characteristics such as a season, a type of a workday, a holiday, etc., of the load of the system may be acquired accurately, avoiding determining a cycle of the load of the system merely from experience, thus increasing an accuracy in load prediction, lowering energy consumption, reducing a cost of power generation, improving economic and social benefits of a power system, etc. Moreover, a law of the daily load of the system in the area may be explored using massive smart meter data, facilitating finding a pattern of a global distribution, avoiding computation of a single index or averaging, lowering impact of a random factor or a subjective factor, which is suitable for finding a law hidden in large-scale data, and is better for representing an overall law.

The invention claimed is:

1. A method for identifying a pattern of a load cycle, comprising:
    performing statistics on a daily load of a system based on smart meter data;
    generating a curve of the daily load of the system according to the statistics on the daily load of the system;
    acquiring a result of clustering curves of loads of typical days by applying shape-based time sequence clustering analysis using the curve of the daily load of the system; and
    identifying a pattern of a load cycle according to the result of clustering the curves of the loads of the typical days;
    performing load prediction according to the result of clustering the curves of the loads of the typical days,
    wherein the generating a curve of the daily load of the system comprises:
    acquiring a curve of a load for 24 hours of the system by accumulating a curve of a load for 24 hours consumed by each smart meter user in an area or the system, wherein the smart meter data comprise active power, reactive power, a voltage, a current, and a power factor, wherein the load is an active power reading, wherein the curve of the daily load of the system describes variation of the load over time within a day, wherein the curve of the daily load varies depending on a workday, a weekend, or a holiday of a season in a region, wherein a curve of a load of a typical day in a typical season, comprising a curve of a load of a typical day and a typical curve of a continued daily load, is used, wherein the performing load prediction according to the result of clustering the curves of the loads of the typical days comprises: searching for a similar day in history according to a factor, grouping or clustering by the shape-based time sequence clustering analysis, and a curve of the daily load in a historical year, and estimating a curve of a load of the system for a day to be predicted according to a curve of the load for the similar day in history, a curve of the load for recent days, and weather forecast data, wherein the factor comprises at least one of a type of a date, a period of time for central heating, a temperature, or a rainfall.

2. The method according to claim 1, wherein time sequence clustering analysis depends on measurement of a distance between a data point and a prototype, wherein curves of similar shapes are clustered together by shape-based clustering, to reduce impact of a difference in an amplitude and a difference in a phase on time sequence clustering, wherein a similarity between shapes of two time sequences is measured via shape-based time sequence clustering analysis by computing cross-correlation of the two time sequences, by comparing the similarity between a time sequence $\vec{x}=(x_1, \ldots, x_m)$ and a time sequence $\vec{y}=(y_1, \ldots, y_m)$, by first keeping the time sequence $\vec{y}$ invariant and computing a distance by which the time sequence $\vec{x}$ is to be translated as:

$$\vec{x} = \begin{cases} (\underbrace{0, \ldots, 0}_{|s|}, x_1, x_2, \ldots, x_{m-s}), & s \geq 0 \\ (x_{1-s}, \ldots, x_{m-1}, x_m, \underbrace{0, \ldots, 0}_{|s|}), & s < 0 \end{cases},$$

wherein $s \in [-m, m]$, $CC_\omega(\vec{x}, \vec{y})=(c_1, \ldots, c_\omega)$ the m is a number of time sequences, the $\omega$ represents a $\omega$th time sequence, $\omega \in \{1, 2, \ldots, 2m-1\}$, $CC_\omega$ is a cross-correlation sequence, $x_1, \ldots, x_m$ are elements of the time sequence $\vec{x}$, $y_1, \ldots, y_m$ are elements of the time sequence $\vec{y}$, and the s is an offset of the $\vec{x}$, wherein a cross-correlation sequence of a length of 2m−1 is defined as:

$$CC_\omega(\vec{x}, \vec{y}) = R_k(\vec{x}, \vec{y}), \omega \in \{1, 2, \ldots 2m-1\}, \text{ wherein}$$

$$R_k(\vec{x}, \vec{y}) = \begin{cases} \sum_{l=1}^{m-k} x_{l+k} y_l, & k \geq 0 \\ R_{-k}(\vec{y}, \vec{x}), & k < 0 \end{cases},$$

wherein a value $\omega$ that maximizes the $CC_\omega(\vec{x}, \vec{y})$ is to be computed, an optimal value $\vec{x}_s$ by which the $\vec{x}$ is to be translated based on the $\vec{y}$ is to be computed based on the value $\omega$, $s=k \circ R_k(\vec{x}, \vec{y})$, the l is an integer starting at 1, the k is an integer with an absolute value less than the m, the $R_k$ represents a cross-correlation sequence, the $x_{l+k}$ is an element of the time sequence $\vec{x}$, the $R_{-k}$ represents a cross-correlation sequence, and the $y_l$ is an element of the time sequence $\vec{y}$.

3. The method according to claim 1, wherein each cluster in the result of clustering the curves of the loads of the typical days acquired by the shape-based time sequence clustering analysis corresponds to a typical type of the daily load in actual data, the typical type of the daily load comprising one of a workday in winter, a holiday in spring, and a weekend in summer, wherein the pattern of the load cycle is identified by data-driven clustering of the curve of the daily load of the system acquired according to the smart meter data of all users in a region, wherein a result of the data-driven clustering describes and identifies the pattern of the load cycle of the system.

4. A device for identifying a pattern of a load cycle, comprising:
a processor; and
memory storing instructions executable by the processor, wherein the processor is arranged for implementing a method for identifying a pattern of a load cycle, the method comprising:
performing statistics on a daily load of a system based on smart meter data;
generating a curve of the daily load of the system according to the statistics on the daily load of the system;
acquiring a result of clustering curves of loads of typical days by applying shape-based time sequence clustering analysis using the curve of the daily load of the system, and
identifying a pattern of a load cycle according to the result of clustering the curves of the loads of the typical days;
performing load prediction according to the result of clustering the curves of the loads of the typical days,
wherein the generating a curve of the daily load of the system comprises:
acquiring a curve of a load for 24 hours of the system by accumulating a curve of a load for 24 hours consumed by each smart meter user in an area or the system,
wherein the smart meter data comprise active power, reactive power, a voltage, a current, and a power factor, wherein the load is an active power reading,
wherein the curve of the daily load of the system describes variation of the load over time within a day, wherein the curve of the daily load varies depending on a workday, a weekend, or a holiday of a season in a region, wherein a curve of a load of a typical day in a typical season, comprising a curve of a load of a typical day and a typical curve of a continued daily load, is used,
wherein the performing load prediction according to the result of clustering the curves of the loads of the typical days comprises: searching for a similar day in history according to a factor, grouping or clustering by the shape-based time sequence clustering analysis, and a curve of the daily load in a historical year, and estimating a curve of a load of the system for a day to be predicted according to a curve of the load for the similar day in history, a curve of the load for recent days, and weather forecast data, wherein the factor comprises at least one of a type of a date, a period of time for central heating, a temperature, or a rainfall.

5. The device according to claim 4, wherein time sequence clustering analysis depends on measurement of a distance between a data point and a prototype, wherein curves of similar shapes are clustered together by shape-based clustering, to reduce impact of a difference in an amplitude and a difference in a phase on time sequence clustering, wherein a similarity between shapes of two time sequences is measured via shape-based time sequence clustering analysis by computing cross-correlation of the two time sequences, by comparing the similarity between a time sequence $\vec{x} = (x_1, \ldots, x_m)$ and a time sequence $\vec{y} = y_1, \ldots, y_m)$, by first keeping the time sequence $\vec{y}$ invariant and computing a distance by which the time sequence $\vec{x}$ is to be translated as:

$$\vec{x} = \begin{cases} (\underbrace{0, \ldots, 0}_{|s|}, x_1, x_2, \ldots, x_{m-s}), & s \geq 0 \\ (x_{1-s}, \ldots, x_{m-1}, x_m, \underbrace{0, \ldots, 0}_{|s|}), & s < 0 \end{cases},$$

wherein $s \in [-m, m]$, $CC_\omega(\vec{x}, \vec{y}) = (c_1, \ldots, c_\omega)$, the m is a number of time sequences, the $\omega$ represents a $\omega$th time sequence, $\omega \in \{1, 2, \ldots, 2m-1\}$, $CC_\omega$ is a cross-correlation sequence, $x_1, \ldots, x_m$ are elements of the time sequence $\vec{x}$, $y_1, \ldots, y_m$ are elements of the time sequence $\vec{y}$, and the s is an offset of the $\vec{x}$, wherein a cross-correlation sequence of a length of 2m−1 is defined as:

$$CC_\omega(\vec{x}, \vec{y}) = R_k(\vec{x}, \vec{y}), \omega \in \{1, 2, \ldots 2m-1\}, \text{ wherein}$$

$$R_k(\vec{x}, \vec{y}) = \begin{cases} \sum_{l=1}^{m-k} x_{l+k} y_l, & k \geq 0 \\ R_{-k}(\vec{y}, \vec{x}), & k < 0 \end{cases},$$

wherein a value $\omega$ that maximizes the $CC_\omega(\vec{x}, \vec{y})$ is to be computed, an optimal value $\vec{x_s}$ by which the $\vec{x}$ is to be translated based on the $\vec{y}$ is to be computed based on the value $\omega$, $s = k \circ R_k(\vec{x}, \vec{y})$ the l is an integer starting at 1, the k is an integer with an absolute value less than the m, the $R_k$ represents a cross-correlation sequence, the $x_{l+k}$ is an element of the time sequence $\vec{x}$, the $R_{-k}$ represents a cross-correlation sequence, and the $y_l$ is an element of the time sequence $\vec{y}$.

6. The device according to claim 4, wherein each cluster in the result of clustering the curves of the loads of the typical days acquired by the shape-based time sequence clustering analysis corresponds to a typical type of the daily load in actual data, the typical type of the daily load comprising one of a workday in winter, a holiday in spring, and a weekend in summer, wherein the pattern of the load cycle is identified by data-driven clustering of the curve of the daily load of the system acquired according to the smart meter data of all users in a region, wherein a result of the data-driven clustering describes and identifies the pattern of the load cycle of the system.

7. A non-transitory computer-readable storage medium having stored therein instructions that, when executed by a processor, cause the processor to perform a method for identifying a pattern of a load cycle, the method comprising:

performing statistics on a daily load of a system based on smart meter data;

generating a curve of the daily load of the system according to the statistics on the daily load of the system;

acquiring a result of clustering curves of loads of typical days by applying shape-based time sequence clustering analysis using the curve of the daily load of the system; and identifying a pattern of a load cycle according to the result of clustering the curves of the loads of the typical days;

performing load prediction according to the result of clustering the curves of the loads of the typical days, wherein the generating a curve of the daily load of the system comprises:

acquiring a curve of a load for 24 hours of the system by accumulating a curve of a load for 24 hours consumed by each smart meter user in an area or the system, wherein the smart meter data comprise active power, reactive power, a voltage, a current, and a power factor, wherein the load is an active power reading, wherein the curve of the daily load of the system describes variation of the load over time within a day, wherein the curve of the daily load varies depending on a workday, a weekend, or a holiday of a season in a region, wherein a curve of a load of a typical day in a typical season, comprising a curve of a load of a typical day and a typical curve of a continued daily load, is used, wherein the performing load prediction according to the result of clustering the curves of the loads of the typical days comprises: searching for a similar day in history according to a factor, grouping or clustering by the shape-based time sequence clustering analysis, and a curve of the daily load in a historical year, and estimating a curve of a load of the system for a day to be predicted according to a curve of the load for the similar day in history, a curve of the load for recent days, and weather forecast data, wherein the factor comprises at least one of a type of a date, a period of time for central heating, a temperature, or a rainfall.

8. The storage medium according to claim 7, wherein time sequence clustering analysis depends on measurement of a distance between a data point and a prototype, wherein curves of similar shapes are clustered together by shape-based clustering, to reduce impact of a difference in an amplitude and a difference in a phase on time sequence clustering, wherein a similarity between shapes of two time sequences is measured via shape-based time sequence clustering analysis by computing cross-correlation of the two time sequences, by comparing the similarity between a time sequence $\vec{x} = (x_1, \ldots, x_m)$ and a time sequence $\vec{y} = y_1, \ldots, y_m)$, by first keeping the time sequence $\vec{y}$ invariant and computing a distance by which the time sequence $\vec{x}$ is to be translated as:

$$\vec{x} = \begin{cases} (\underbrace{0, \ldots, 0}_{|s|}, x_1, x_2, \ldots, x_{m-s}), & s \geq 0 \\ (x_{1-s}, \ldots, x_{m-1}, x_m, \underbrace{0, \ldots, 0}_{|s|}), & s < 0 \end{cases},$$

wherein $s \in [-m, m]$, $CC_\omega(\vec{x}, \vec{y}) = (c_1, \ldots, c_\omega)$, the m is a number of time sequences, the $\omega$ represents a $\omega$th time sequence, $\omega \in \{1, 2, \ldots, 2m-1\}$, $CC_\omega$ is a cross-correlation sequence, $x_1, \ldots, x_m$ are elements of the time sequence $\vec{x}$, $y_1, \ldots, y_m$ are elements of the time sequence $\vec{y}$, and the s is an offset of the $\vec{x}$, wherein a cross-correlation sequence of a length of 2m−1 is defined as:

$$CC_\omega(\vec{x}, \vec{y}) = R_k(\vec{x}, \vec{y}), \omega \in \{1, 2, \ldots 2m-1\}, \text{ wherein}$$

$$R_k(\vec{x}, \vec{y}) = \begin{cases} \sum_{l=1}^{m-k} x_{l+k} y_l, & k \geq 0 \\ R_{-k}(\vec{y}, \vec{x}), & k < 0 \end{cases},$$

wherein a value $\omega$ that maximizes the $CC_\omega(\vec{x}, \vec{y})$ is to be computed, an optimal value $\vec{x_s}$ by which the $\vec{x}$ is to be translated based on the $\vec{y}$ is to be computed based on the value $\omega$, $s = k \circ R_k(\vec{x}, \vec{y})$ the l is an integer starting at 1, the k is an integer with an absolute value less than the m, the $R_k$ represents a cross-correlation sequence, the $x_{l+k}$ is an element of the time sequence $\vec{x}$, the $R_{-k}$ represents a cross-correlation sequence, and the $y_l$ is an element of the time sequence $\vec{y}$.

9. The storage medium according to claim 7, wherein each cluster in the result of clustering the curves of the loads of the typical days acquired by the shape-based time sequence clustering analysis corresponds to a typical type of the daily load in actual data, the typical type of the daily load comprising one of a workday in winter, a holiday in spring, and a weekend in summer, wherein the pattern of the load cycle is identified by data-driven clustering of the curve of the daily load of the system acquired according to the smart meter data of all users in a region, wherein a result of the data-driven clustering describes and identifies the pattern of the load cycle of the system.

\* \* \* \* \*